Sept. 23, 1924.                                          1,509,399
                       I. J. FELTENSTEIN
                   ROLL ATTACHMENT FOR CAMERAS
                     Filed June 7, 1921         4 Sheets-Sheet 1
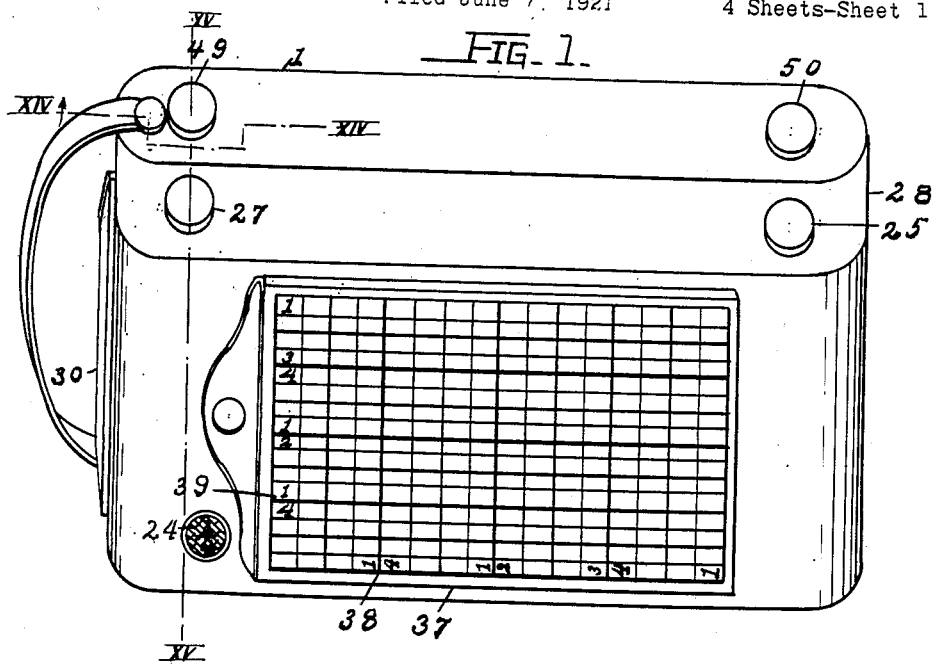
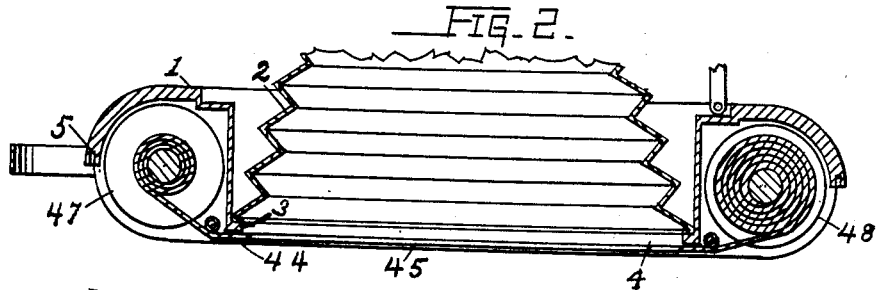
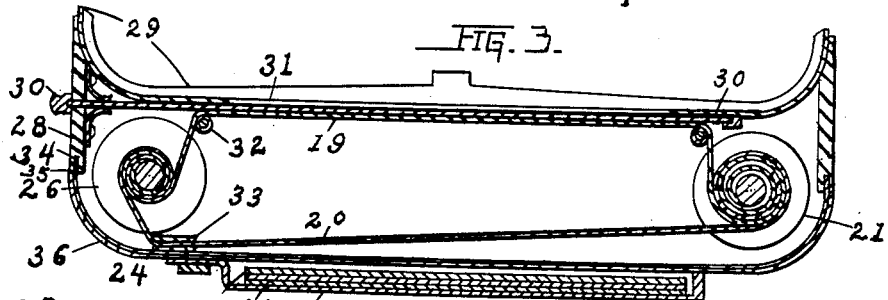
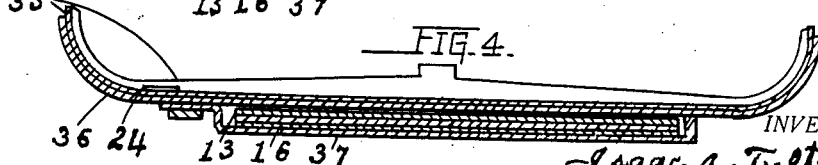
INVENTOR.
Isaac J. Feltenstein
BY
George W. Hinton
ATTORNEYS.

Sept. 23, 1924.
I. J. FELTENSTEIN
1,509,399
ROLL ATTACHMENT FOR CAMERAS
Filed June 7, 1921
4 Sheets-Sheet 2
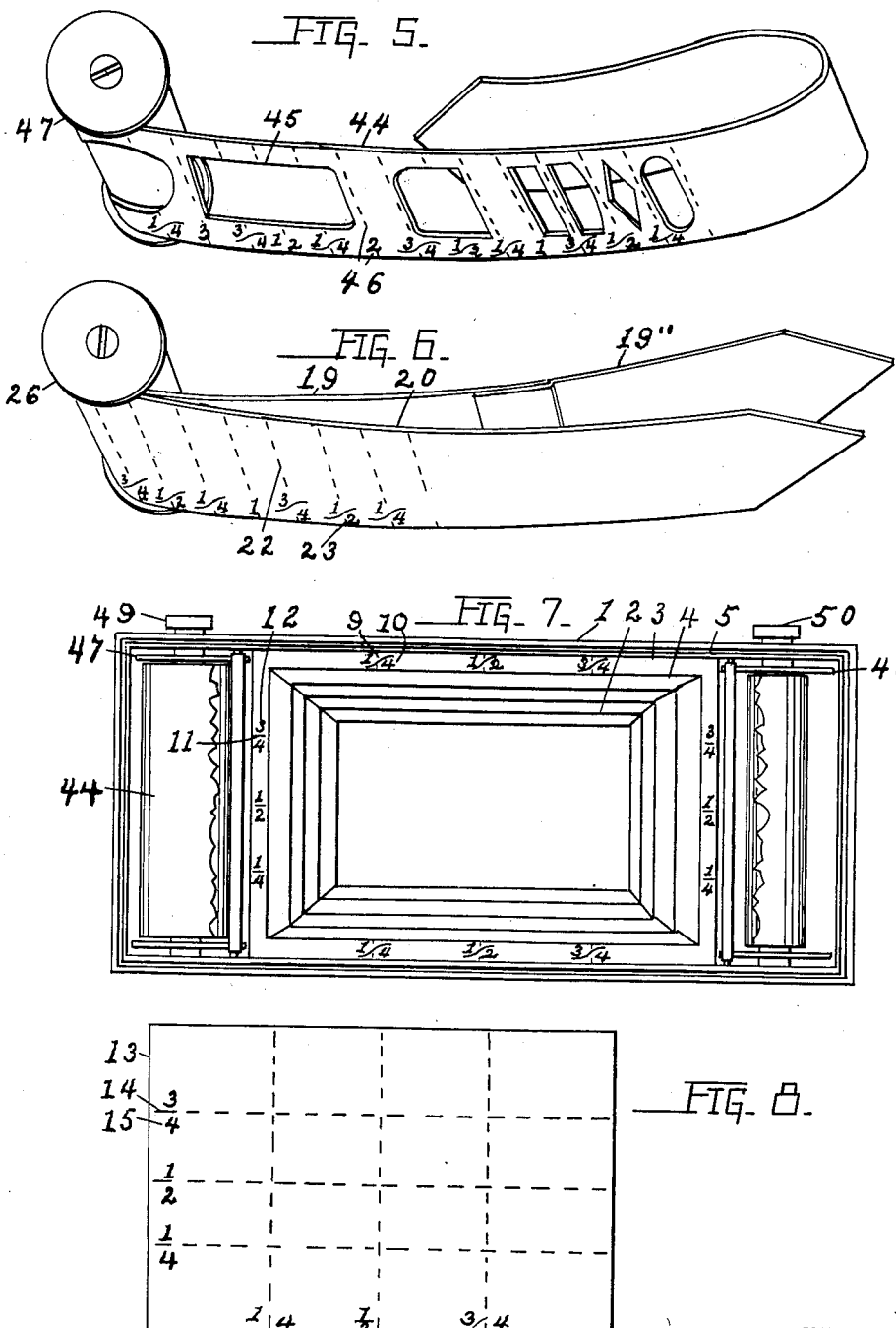

Sept. 23, 1924.
I. J. FELTENSTEIN
1,509,399
ROLL ATTACHMENT FOR CAMERAS
Filed June 7, 1921 4 Sheets-Sheet 3
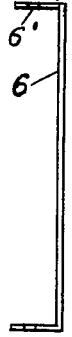
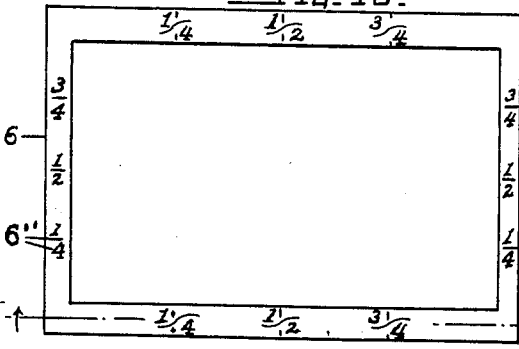
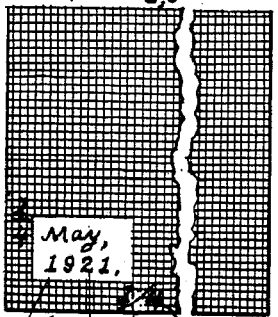
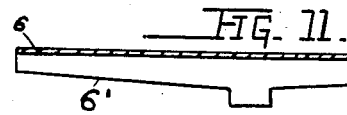
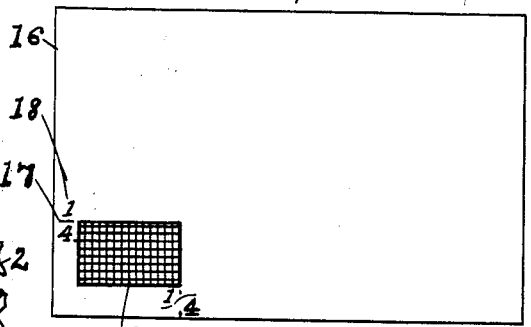
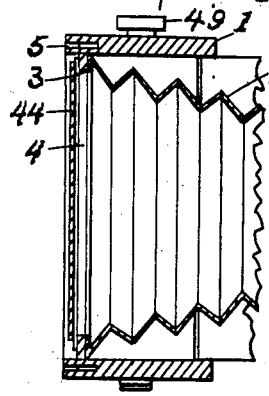
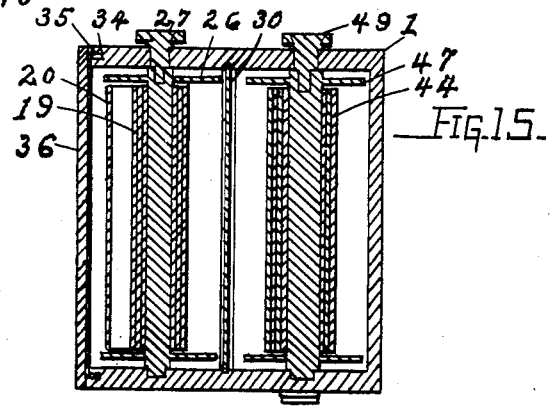
INVENTOR.
Isaac J. Feltenstein
BY
George W. Hinton
ATTORNEYS.

Sept. 23, 1924.  
I. J. FELTENSTEIN  
1,509,399  
ROLL ATTACHMENT FOR CAMERAS  
Filed June 7, 1921  
4 Sheets-Sheet 4
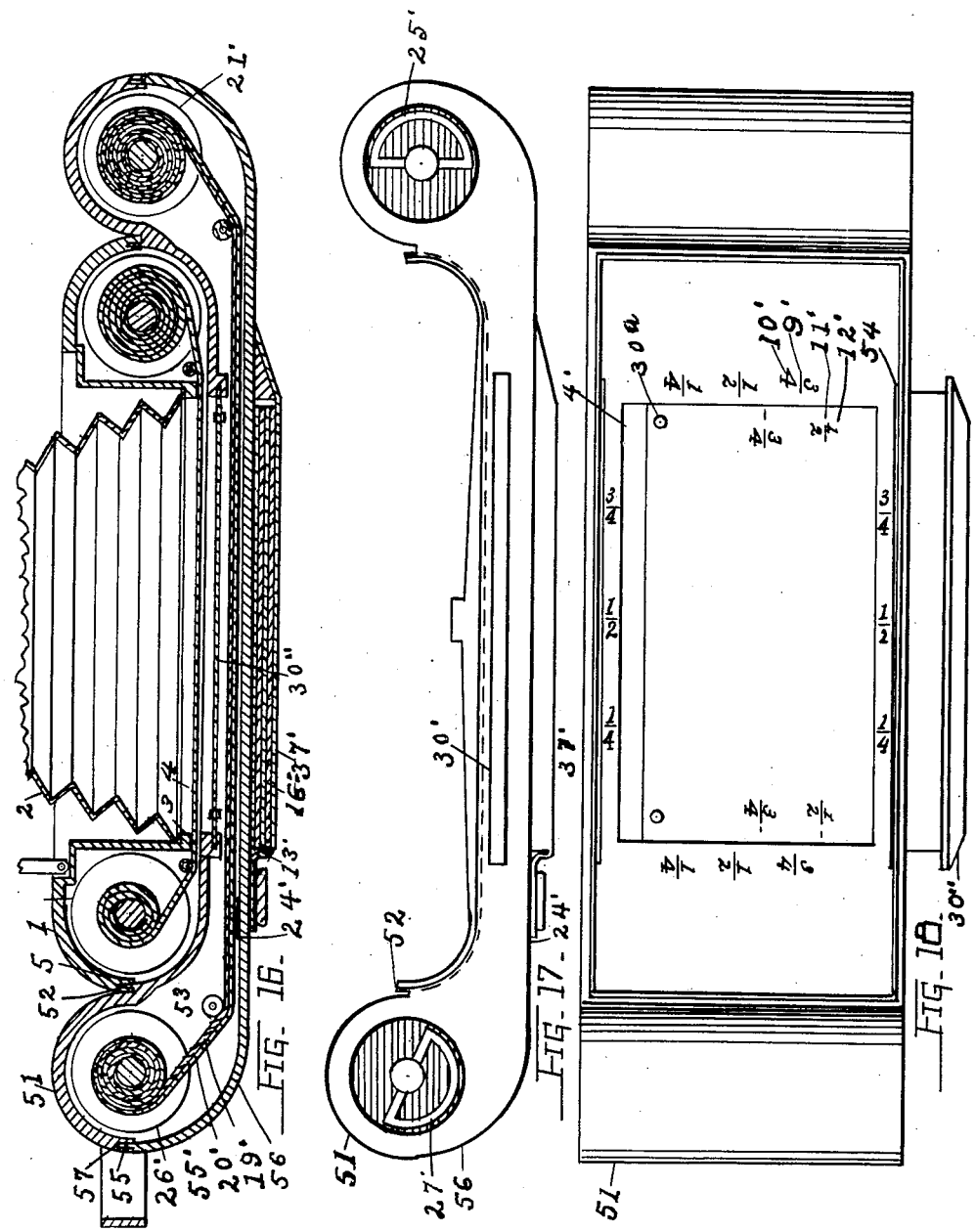

Patented Sept. 23, 1924.

1,509,399

UNITED STATES PATENT OFFICE.

ISAAC J. FELTENSTEIN, OF ST. JOSEPH, MISSOURI.

ROLL ATTACHMENT FOR CAMERAS.

Application filed June 7, 1921. Serial No. 475,586.

*To all whom it may concern:*

Be it known that I, ISAAC J. FELTENSTEIN, a citizen of the United States, residing at St. Joseph, in the county of Buchanan and State of Missouri, have invented certain new and useful Improvements in Roll Attachments for Cameras, of which the following is a specification, reference being had therein to the accompanying drawing.

My invention relates to improvements in roll holders for cameras, and the objects of my improvements are, first; to provide a holder of this class, which can easily and quickly be attached to or detached from the cameras now generally in use, without altering or changing the cameras in any way, second; to so construct an attachment of this class, that it can be used as a sensitive-film holder, while the therewith connected camera is used as a mask holder, for masking out various parts of the exposed portion of the film; thereby enabling the user of the attachment, to make a number of small exposures on said film, in the space alloted to a full exposure, third; to so construct the attachment, that a roll of opaque material, provided with a number of exposure openings of various forms and proportions formed therethrough, can be set as desired, without exposing the sensitive film to the light, fourth; to so construct and proportion the attachment, that the camera back can be used as a back for the attachment, fifth; to provide ready means, whereby sheet masks, such as are generally in use, and a ground glass, for focusing, can be inserted in the camera; sixth; to provide lines and fractional indications formed on certain parts of the invention and the camera, from which the proportions and exact positions of the mask openings can readily be determined.

I attain these objects by the mechanism illustrated in the accompanying drawings, in which:

Figure 1 is a view in perspective of the camera, with the roll holder attachment detachably secured thereon and the interchangable back similarly secured on the back of the attachment.

Fig. 2 is a longtudinal section, cut horizontally through the center of the camera, a portion of the camera being broken away. Fig. 3 is a section similar to Fig. 2, of the attachment and of the interchangeable back. Fig. 4 is a similar section of the back detached. Fig. 5 is a view in perspective, of a roll of masks. Fig. 6 is a similar view of a roll of sensitive film and its indicating sheet.

Fig. 7 is a rear view of the camera. Fig. 8 is a rear view of the ground glass. Fig. 9 is an end view of the ground glass holder. Fig. 10 is a rear view of the holder, seen in Fig. 9. Fig. 11 is a longitudinal section of the holder, on line XI—XI of Fig. 10. Fig. 12 is a rear view of one of the sheet masks. Fig. 13 is a similar view of the sheet mask which is the companion to the mask seen in Fig. 12. Fig. 14 is a broken longitudinal section, on line XIV—XIV of Fig. 1. Fig. 15 is a broken section of the camera and of the attachment connected therewith, on line XV—XV of Fig. 1. Fig. 16 is a horizontal section, cut longitudinally through the center of the camera and through one of the various other forms of attachments, which may be used. Fig. 17 is a side view of the attachment seen in Fig. 16. Fig. 18 is a front view of this form of attachment.

Referring to Fig. 2, the camera 1 is provided with the bellows 2, the rear edge of which is secured on the frame 3, which bounds the exposure opening 4. The rear edge of said camera is provided with the channel 5, (see Fig. 7,) formed therein, for the reception of the hereinafter described attachment flange and the flange on the interchangeable back.

The flanges 6′ of the ground glass holder 6 (see Fig. 9,) are inserted in the central parts of the longitudinal portions of the channel 5, (see Fig. 7,) for holding the ground glass 13 (see Fig. 8,) and the sheet masks 16 and 16′, (see Figs. 12 and 13 respectively,) between the marginal portions of said holder and the frame 3, seen in Fig. 7.

The lines 9 and their indications 10, and the line 11 and their indications 12, are formed on the rear surface of the frame 3, for indicating the longitudinal and transverse divisions, respectively, into which said lines subdivide the exposure opening 4.

The ground glass 13 (see Fig. 8,) is provided with the lines 14 and their indications 15, formed thereon, for similarly subdividing its illuminated surface; thereby enabling the user of the same, to focus on and place the view or object in such part of a full exposure as desired.

The sheet mask 16 (see Fig. 12,) is similarly provided with the lines 17 and the indications 18, for showing which part of a full exposure is masked thereby, as seen at 43.

The mask 16' is provided with the lines 17' and the indications 18' for similarly showing the location of the space 43' in which appears the inscription 43".

The sensitive film 19 (see Fig. 6,) is provided with the indicator sheet 20, which is wound on the back of said film, on the roll 21. The lines 22 and their indications 23 are formed on the rear surface of said indicator sheet, for indicating the points to which said indicator sheet and the therewith wound film are to be moved, in making full exposures and fractional parts of a full exposure, which are unwound from roll 26, seen in Fig. 3.

Said indications are visible through the window 24, (see Fig. 1,) which window is closed by a non-actinic pane, in the usual manner. The extension sheet 19" is secured on the end of the film 19.

The roll 21 is connected with the winding knob 25, seen in Fig. 1. The roll 26 (see Fig. 3,) is similarly provided with the knob 27. Said rolls 21 and 26 are rotatably mounted in the attachment 28, which latter is provided with the flange 29 which extends from its front edge. Said flange is inserted in the channel 5, (see Fig. 2,) forming a light tight joint between the camera and the attachment.

When said attachment is not in use, it is removed from said camera, the shutter 30, which is slidably mounted therein being closed, as shown, for closing the exposure opening 31, which is formed through the front face of said attachment.

The studs 30' (of which but one is shown,) limit the outward movement of said shutters, said studs being seen in Fig. 3.

The guide rollers 32 are rotatably mounted in said attachment, for guiding the sensitive film 19. The guide piece 33 is secured in said attachment, for guiding the indicator sheet 20, close to the window 24.

The channel 34 is formed in the rear edge of the attachment 28, in which channel the flange 35 (which is formed on the front edge of the back 36), is inserted.

The pocket 37 is formed on the rear surface of said back 36, and holds the ground glass 13 and a plurality of the sheet masks 16, (see Figs. 8 and 12 respectively,) for convenience in carrying the same. The outer surface of said pocket is preferably white, on which the lines 38 and 39 are formed for indicating the fractional parts of the length and width respectively, of said white surface.

Said lines correlate with the lines 14, on the ground glass 13, (see Fig. 8,) and with the other lines, which correlate with each other as described.

The mask 16 (see Fig. 12,) is formed of transparent material, such as celluloid, on which the opaque space 43 is formed by applying any opaque substance thereon, such as ink, paint and the like. While this is being done, said mask is laid on the pocket 37, (see Fig. 1,) and the lines 38 and 39 are used as guides, in applying said opaque substance. The mask 16' (see Fig. 13,) is formed in the same manner, except that space 43' is not rendered opaque, and the inscription 43" is written thereon with an opaque ink, as seen in Fig. 13.

The lines 38 and 39 (see Fig. 1,) enable the user of the camera, to see which portion of a piece of celluloid should be rendered opaque, in forming other sheet masks for use in making exposures of differently arranged and proportioned inscriptions.

The roll of masks 44 (see Fig. 5,) is formed of any substantial opaque material, through which the variously shaped and proportioned openings 45 are formed. The transversely arranged lines 46 are formed on said material, for showing the distance said sheet of masks should be moved, for making whole and for making fractional parts of a full exposure. Said sheet of masks is wound on the roll 47, and is unwound therefrom, onto the roll 48, seen in Fig. 2.

Said rolls are respectively provided with the knobs 49 and 50, (seen in Fig. 1,) whereby they are rotated.

All of said rolls are rotatable in either direction, for winding and unwinding the rolls of film and masks, which are wound thereon.

In the operation of the attachment, with the parts in the position shown in Figs. 2 and 3, the operator places the ground glass 13 (see Fig. 8,) on the camera frame 3, in register with the exposure opening 4, seen in Fig. 2. He then inserts the flanges 6' of the ground glass holder 6 (see Fig. 9,) in the channel 5, (see Fig. 7,) in register with the exposure opening 4, for holding said ground glass in position, after which he focusses the camera 1, (see Fig. 2,) in the usual manner. He then removes said ground glass from said holder, after which he places the mask 16 (see Fig. 12,) in said ground glass holder, which latter he presses against said mask, for holding it in position.

Said operator then secures the attachment 28 (see Fig. 3,) on the camera 1, as seen in Fig. 1, after which he draws out the slide shutter 30, thereby making an exposure through said mask 16.

Said operator then covers the thus exposed sensitive film 19, by returning the shutter 30, from its described position, to the position shown. He then removes said attachment from said camera, after which he removes the mask 16 from the ground glass holder 6, and in place thereof, he inserts the companion mask 16' (see Fig. 13,) and secures it in correlated position, which correlation is determined by the lines 17' which are placed in register with the lines 6'' which are formed on the ground glass holder 6, seen in Fig. 10.

Said operator then secures the attachment 28 (see Fig. 3,) on the camera 1, (see Fig. 2,) after which he so moves said camera that its unshown lens points toward the sky or any white object. He then withdraws the slide shutter 30 to the limit of its outward movement, thereby exposing the sensitive film through said space 43' of the mask 16' to the admitted light.

The results of these operations are the making of a negative on the sensitive film 19, in such manner, that the inscription 43'' (see Fig. 13,) shows in black against a white ground, in all of the unshown photographic prints, which are made from said negative.

Said operator then returns the shutter 30 (see Fig. 3,) from its described position, to the position shown.

Said operator then removes the attachment 28 from the camera 1, removes the ground glass holder 6 and the mask 16' (see Figs. 10 and 13 respectively,) from the camera.

In making exposures of the film to light, through the smaller ones of the openings 45, seen in Fig. 5, said operator grasps the knob 50, (see Fig. 1,) and thereby rotates the roll 48, which winds a portion of the roll of masks 44 thereon until the desired one of said openings is in the desired position, over the exposure opening 4, seen in Fig. 2. Said desired position is determined from the lines 9 (see Fig. 7,) and the lines 46, seen in Fig. 5.

Said operator then reattaches the attachment 28 onto the camera 1, as seen in Fig. 1, after which he rotates the knob 25, thereby rotating the roll 21, (see Fig. 3,) until the desired designation (see Fig. 6,) is in register with and is visible through the window 24, thereby showing that the film 19 has been moved the desired distance for making the exposure, after which said film is exposed to light in the previously described manner, after which the shutter 30 is closed. While I have shown and described my invention in the foregoing manner, it is evident that where conveniences are required, such as placing the camera and the attachment in the coat pocket, said attachment may be made of greater length and less depth than the previously described attachment without departing from the spirit of my invention, which I reserve the right to do. One of such proportioned attachments is shown in Figs. 16, 17 and 18, in which the attachment 51 is provided with the flange 52, projecting from its front edge, which flange is inserted in the channel 5, in the camera 1, as seen in Fig. 16, for detachably securing said attachment on said camera.

The guide rollers 53 are rotatably mounted in said attachment, for guiding the sensitive film 19' and its indicator sheet 20', which are wound onto the roll 21', from the roll 26', which rolls are rotatably mounted in said attachment 51.

Said rolls are respectively provided with the tip-down keys 25' and 27', (see Fig. 17,) whereby said rolls are rotated.

The slide shutter 30'' is slidably mounted in the attachment and is provided with the studs 30$^a$, for limiting outward movement of said shutter.

The lines 11' and their characters 12' are formed on the transverse edge portions of the shutter, from which the operator of the attachment, determines the distance the shutter should be withdrawn from the attachment, in making the fractional part of a full exposure.

The lines 9' and their characters 10' are formed on the marginal portion of the attachment, around the exposure opening 4'. Said lines enable the operator of the attachment to determine the location in which to place the mask space 43', seen in Fig. 13. Said mask is placed on said marginal portion of the attachment, after which the flanges 6' of the ground glass holder 6 (see Figs. 9 and 10,) are inserted in the channels 54, (see Fig. 18,) which are formed in the attachment.

The flanges 55 (see Fig. 16,) are formed on and extend from the front edge of the back 56. Said flanges are inserted in the channels 57, which are formed in the rear edge of the attachment 51.

Since the operation of said attachment is the same as the previously described operation of the attachment 28, seen in Fig. 3, a description of said operation is deemed unnecessary.

Having fully described my invention, what I claim as new and desire to secure by Letters Patent, is:

1. In combination with a camera having a rear exposure opening and rolls for supporting a film in position for exposure at said opening, an attachment to the rear portion of said camera, and rolls mounted in said attachment for supporting a second film at the exposure opening when the same is not covered by the first-mentioned film.

2. In combination with a camera having a rear exposure opening and rolls for supporting a film in position for exposure at said opening, an attachment to the rear portion of said camera, rolls mounted in said attachment for supporting a second film at the exposure opening when the same is not covered by the first-mentioned film, and a removable back to said attachment whereby access may be had to the interior thereof.

3. In combination with a camera having a rear exposure opening and rolls for supporting a film in position for exposure at said opening, an attachment to the rear portion of said camera, rolls mounted in said attachment for supporting a second film at the exposure opening when the same is not covered by the first-mentioned film, and rollers journaled in the attachment for guiding the second film close to the exposure opening.

4. In combination with a camera having marginal channels in its rear portion, a rear exposure opening, and rolls for supporting a film in position for exposure at said opening; a removable attachment having flanges to fit into said marginal channels, and rolls mounted in said attachment for supporting a second film at the exposure opening when the same is not covered by the first-mentioned film.

5. In combination with a camera having a rear exposure opening and rolls for supporting a film in position for exposure at said opening, an attachment to the rear portion of said camera having a second exposure opening registering with the first-mentioned opening, rolls mounted in said attachment for supporting a second film in position for exposure when the first-mentioned film is not covering the first-mentioned opening, and a shutter slidably mounted in the attachment to cover and uncover the exposure opening therein.

6. In combination with a camera having a rear exposure opening and rolls for supporting a film in position for exposure at said opening, a relatively shallow attachment to close the rear portion of said camera and having forwardly projecting end portions which overlap the ends of the camera, and a roll mounted in each overlapping end of said attachment for supporting a second film at the exposure opening, substantially as described.

In testimony whereof I affix my signature.

ISAAC J. FELTENSTEIN.